United States Patent [19]

Cohen

[11] 3,919,130

[45] Nov. 11, 1975

[54] TIRE TREAD COMPOSITIONS OF IMPROVED WET SKID RESISTANCE

[75] Inventor: Harvey L. Cohen, Matawan, N.J.

[73] Assignee: Exxon Research and Engineering Company, Linden, N.J.

[22] Filed: June 3, 1974

[21] Appl. No.: 475,988

[52] U.S. Cl. .................... 260/4; 156/128; 260/5; 260/85.3; 260/888; 260/889; 260/890; 260/892; 260/894; 260/896
[51] Int. Cl.² .................... C08L 7/00; C08L 23/20
[58] Field of Search ............ 260/888, 889, 85.3, 4, 260/896, 5, 892, 894

[56] References Cited
UNITED STATES PATENTS

| | | | |
|---|---|---|---|
| 3,250,733 | 5/1966 | Giller et al. | 260/888 |
| 3,483,176 | 12/1969 | Miyoshi et al. | 260/85.3 R |

*Primary Examiner*—Murray Tillman
*Assistant Examiner*—J. Ziegler
*Attorney, Agent, or Firm*—A. Lagani, Jr.; William T. Clarke

[57] ABSTRACT

Tires having an improved wet skid resistance are prepared by blending into conventional tire tread compositions a copolymer of isobutylene and cyclopentadiene having a cyclopentadiene content of at least 20 mole %. The tire tread composition preferably contains about 30 weight percent of cyclopentadiene copolymer.

7 Claims, 1 Drawing Figure

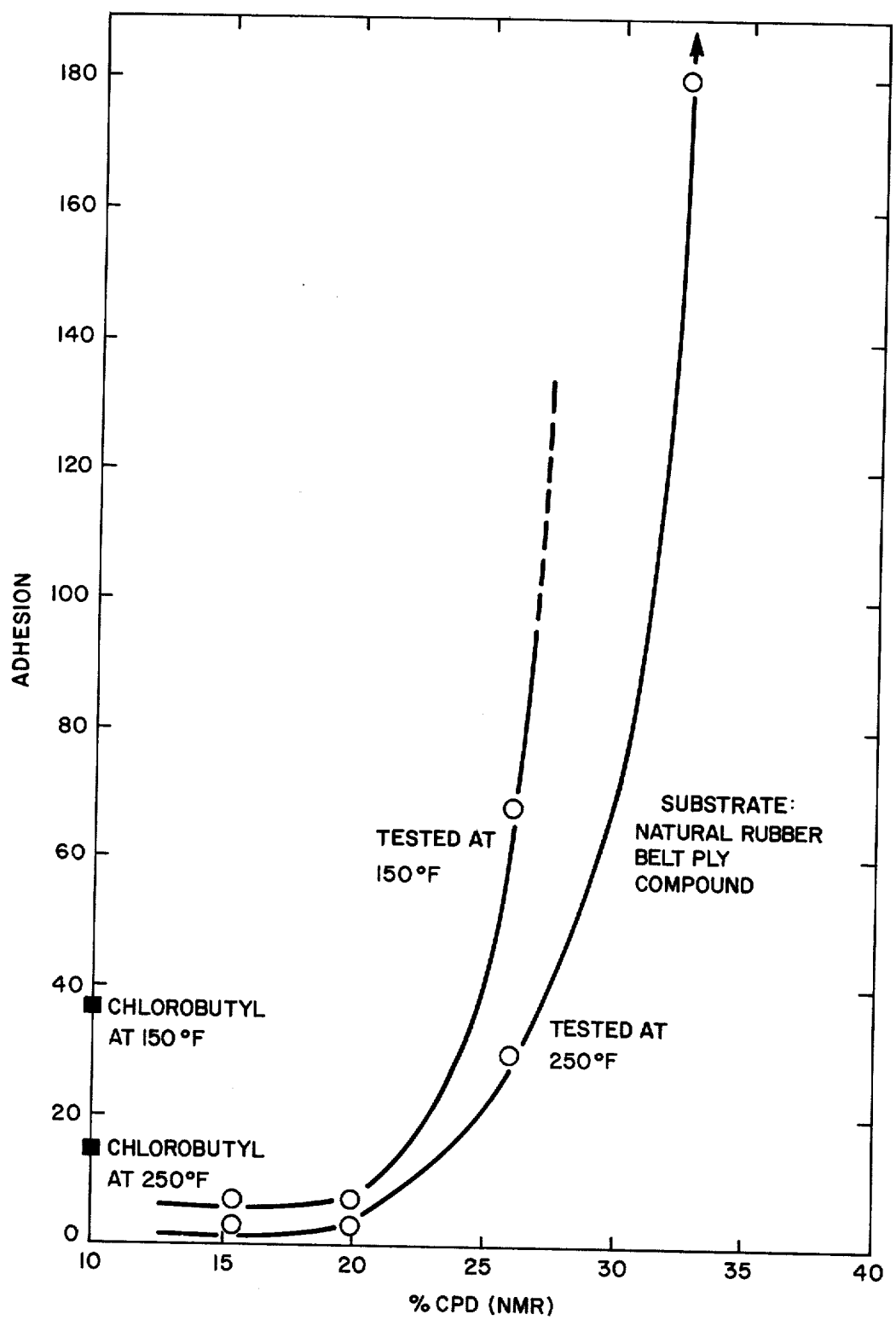

TIRE TREAD COMPOSITIONS OF IMPROVED WET SKID RESISTANCE

BACKGROUND OF THE INVENTION

Automobile tires are finally prepared as composites of various materials, the primary component being rubber. Generally, various parts of the tires are prepared from different formulations in order to demonstrate optimum properties in their respective functions.

The tire tread of an automobile tire in addition to being the wear surface must also exhibit good skid resistance and, in particular, good wet skid resistance.

Rubbers which have been used in the manufacture of tire tread compositions include natural rubber and synthetic rubbers, such as polyisoprene, butyl rubber, styrene butadiene rubber (SBR), polybutadiene rubber (PBR), ethylene propylene diene copolymers (EPMs and EPDMs) and mixtures thereof in various proportions. Tires prepared from butyl rubber have been found to have better skid resistance than others. However, wear properties are inadequate. More recently, blends of chlorinated butyl rubber with styrene butadiene rubber and polybutadiene have been prepared which demonstrate improved wet skid resistance but which have wear characteristics inferior to that of conventional tire tread compositions.

SUMMARY OF THE INVENTION

It has been surprisingly found that by incorporating about 30 weight percent of a copolymer of isobutylene and cyclopentadiene into a conventional tire tread composition of general purpose rubber, e.g., SBR and polybutadiene, the wet skid resistance can be improved without significant concomitant decrease in other important properties of the tire.

The cyclopentadiene copolymer should contain at least 20 mole percent cyclopentadiene.

The compositions prepared from such blends demonstrate wet skid resistance superior to those of conventional blends while at the same time other properties such as wear and heat buildup are not adversely affected to an objectionable degree.

BRIEF DESCRIPTION OF THE DRAWING

The FIGURE shows adhesion of tire tread compositions as a function of CPD content.

DETAILED DESCRIPTION

This invention relates to an improved tire tread composition. In particular, it relates to a tire tread composition having improved wet skid resistance.

The compositions of this invention comprise various general purpose rubbers in combination with a copolymer of isobutylene and cyclopentadiene. The composition will generally comprise about 30% of the cyclopentadiene copolymer, the balance being general purpose rubbers. The compositions should comprise at least 20% cyclopentadiene copolymer; preferably the composition comprises about 20–40 weight percent cyclopentadiene copolymer, more preferably about 25 to about 35 weight percent, e.g., 30 weight percent.

The term "butyl rubber" as employed in the specification and claims is intended to include copolymers made from a polymerization reactant mixture having therein about 70–99.5 percent by weight of an isoolefin which has about 4–7 carbon atoms and about 30–0.5 percent by weight of a conjugated multiolefin having about 4–14 carbon atoms. The resulting copolymer contains 85–99.5 percent of combined isoolefin and 0.5 to 15 percent of combined multiolefin. The term "butyl rubber" is described in an article by R. M. Thomas et al in *Industrial Engineering and Chemistry*, Vol. 32, pp. 1283 et seq., October, 1940.

The butyl rubber generally has a Staudinger molecular weight between about 20,000 to about 500,000; preferably about 25,000 to about 200,000; especially 45,000 to 60,000 and a Wijs iodine number of about 0.5 to about 50; preferably 1 to 15. The preparation of butyl rubber is described in U.S. Pat. No. 2,356,128, which is incorporated herein by reference.

The halogenated rubbery isoolefin-multiolefin-containing copolymers, particularly chlorinated butyl rubber, are produced by careful halogenation of the rubbery isoolefin-multiolefin copolymers in a manner which does not degrade the molecular weight thereof as more fully described hereinafter.

In order to produce halogenated butyl rubber, the halogenation is regulated so that the resulting rubber will contain about at least 0.5 weight percent (preferably at least about 1.0 weight percent) combined halogen, but not more than about X weight percent combined chlorine or 3.0 X weight percent combined bromine wherein:

$$X = \frac{M_3 L}{(100-L)M_1 + L(M_2+M_3)} \times 100$$

and:

L = mole percent of the multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hypobromites, $C_4$–$C_{10}$ tertiary alkyl hypochlorites, sulfur bromides, sulfuryl chlorides, pyridinium chloride perchloride, N-bromosuccinimide, alpha-chloroacetanilide, N,N'-dichloro-5,5-dimethyl hydantoin, iodine halides, trichlorophenolchloride, N-chloroacetamide, betabromo-methyl-phthalimide. Preferred halogenating agents are gaseous chlorine, liquid bromine, sulfuryl chloride, sulfuryl bromide, chlorohydantoins, bromohydantoins, iodine monochloride and related materials. The halogenation is generally conducted at temperatures above 0° to about +100°C., depending upon the particular halogenating agent, for about 1 minute to several hours. An advantageous pressure range of from about 0.1 to 1,000 psia, atmospheric pressure being satisfactory. The halogenation may be accomplished by preparing a 1 to 30 weight percent solution of such polymers as above in a substantially inert liquid organic solvent such as $C_3$–$C_8$ substantially inert hydrocarbons or halogenated derivatives of saturated hydrocarbons, e.g. hexane, mineral spirits, cyclohexane, benzene, chlorobenzene, chloroform, carbon tetrachloride, mixtures thereof, etc. and adding thereto the halogenating agent which may optionally be dissolved in a substantially inert $C_3$–$C_{12}$ hydrocarbon, a $C_1$–$C_5$ alkyl chloride, carbon tetrachloride, carbon disulfide, etc. If chlorine gas is employed, it may also be diluted with up to about 50, preferably 0.1 to 5, times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried at about 1 to 760 millimeters or higher of mercury pressure absolute, at about 0° to 180°C., preferably at about 50° to 150°C., e.g., 70°C. Other methods of recovering the chlorinated polymer are by conventional spray or drum drying techniques.

Alternately, the solution of the halogenated rubber may be injected into a vessel containing steam and/or agitated water heated to a temperature sufficient to volatilize the solvent and form an aqueous slurry of the rubber. This halogenated rubber may be separated from the slurry by screening or filtration and recovered as a crumb. As so produced, the halogenated rubbery polymer has a Staudinger molecular weight within the range of approximately 20,000 to 500,000, preferably 25,000 to 200,000.

The term EPDM as used in the specification and claims is used in the sense of its definition found in ASTMD-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference.

The term "CPD copolymers" as used in the specification and claims means a copolymer of isoprene and cyclopentadiene. The preparation of such copolymers is well known in the art; see, for example, U.S. Pat. 3,808,177, incorporated herein by reference.

The term "general purpose rubber" as used in the specification and claims means the high unsaturation rubbers of commerce including natural rubber, polyisoprene, styrene butadiene rubber (SBR), and polybutadiene rubber (PBR). In the usual preparation of compositions for use in automotive tire tread manufacture, it is customary to use a blend of one or more of the above general purpose rubbers in order to make use of the most advantageous properties of each. A conventional tire tread formulation comprises about 70 weight percent SBR and about 30 weight percent PBR.

In evaluating compositions for use in tire tread manufacture, various characteristics of the tire tread must be evaluated in the laboratory. These characteristics include wet skid resistance, wear as measured by abrasion resistance, adhesion of the tire tread composition to various tire component substrates, heat build-up in the composition during dynamic testing and tensile strength.

The tests used in evaluating the composition of this invention are described as follows:

1. Wet skid resistance — Wet skid resistance was measured using standard tests designated ASTM E303-69. This test comprises scuffing a test sample across a wet test plate which simulates the road surface. The test plate used in these studies was Syenite glass since this composition has characteristics similar to the road surface.

In carrying out the test, a test sample is secured to a pendulum which is released and caused to scuff across the test plate. As the pendulum swings past the test plate, it moves a pointer. The motion of the pointer is limited by the arc through which the test sample pendulum moves. The reading obtained is an absolute number.

2. Abrasion resistance — The abrasion resistance used in these evaluations was Pico abrasion tests designated ASTM D-2228. In this test, the sample was brought into contact with a rotary head containing abrasion surfaces. Weight loss as a measure of wear is related to the average value of 5 different standard compositions. It is calculated by taking the ratio of the average loss of the standard samples over the weight loss of the test sample multiplied times 100.

3. Adhesion to natural rubber substrate — The adhesion tests were carried out by using the strip adhesion test, similar to ASTM designation D-2630 entitled Strappeel Adhesion of Reinforcing Fabrics or Cords to Rubber. In this test, a four-layer composite consisting of a rubber compound substrate and the test composition are vulcanized with support backings of rubber-coated tire cord being placed on either side of the test specimen. The sandwich comprising two outer layers of backing and the two test compounds, e.g., the compound under investigation and the compound to which adhesion is to be measured are vulcanized together. The rubber compounds are separated at one end by a strip of Mylar to give a free end from which the samples may be grasped for testing in an Instron tester.

4. Heat build-up — Heat build-up is measured in a Goodrich flexometer test, ASTM designation D-623, Method A. The variables used in the test are run time, load, deflection and test temperature. The temperature rise of the sample is measured.

5. Tensile strength — Tensile strength is measured using an Instron tester with a head speed of 20 inches per minute. Properties measured are modulus at various elongations, tensile strength and elongation at failure.

6. Hardness — Hardness is measured by test method ASTM D-2240.

7. Damping — Measured using an MTS-830 Elastomer Test System. Hydraulically driven, forced-vibration tester; rectangular cross-section blocks, 190 lb. compressive preload, frequency and displacement varied.

Experience indicates that various standards must be met for satisfactory tread compounds. In addition, comparison of the compositions to a typical or standard tire tread formulation provides a suitable reference. The wet skid resistance of a 70/30 SBR/PBR blend is 17. The goal of the test is to equal or better this wet skid resistance value. The abrasion resistance of the SBR polybutadiene blend is 150 to 170. The target for these tests is a value of about 85–95 which is the abrasion index of a composition comprising 50 parts of SBR, 20 parts of PBR and 30 of chlorinated butyl rubber. This composition demonstrates abrasion resistance less than that of the SBR/PBR blends, and has been found to be marginal-to-less-than-acceptable in actual tire field testing. The adhesion strength of the composition must be a minimum of 25 pounds per inch at 250°F. However, it is noted that chlorinated butyl rubber compositions having adhesion strengths of approximately 10 pounds per inch based on laboratory compounding and testing were demonstrated to be adequate in the field testing of tires. The heat buildup in the tire tread composition must be less than 100°F. and the tensile strength should be at least 2,000 psi. In carrying out the experiments set forth in this specification, a basic tire tread formulation was employed and is shown in Table I.

TABLE I

| BASIC BLEND TREAD FORMULATION EMPLOYED | |
| --- | --- |
| SBR 1502[1] | 50 |
| cis-4 PBR 1203[2] | 20 |
| Test Rubber | 30 |
| N-339 Black[3] | 65 |
| Sundex 790 Oil[4] | 30 |
| Thermoflex A [5] | 0.75 |
| Stearic Acid | 1 |
| Zinc Oxide | 3 |
| Sulfur | 1.6 |
| Santocure NS[6] | 1.2 |
| DPG [7] | 0.1 |

[1]Bound styrene = 23.5%, Mooney Viscosity (ML 1+4 at 212°F.) = 52
[2]cis content = 93%, Mooney Viscosity (ML 1+4 at 212°F.) = 45
[3]ASTM D-1765 classification.
[4]Aromatic extender oil, ASTM D-2226 Type 102.
[5]Antiflex cracking antioxidant: (50%) N-phenyl-beta-naphthylamine, (25%) 4,4'-dimethoxydiphenylamine phenyl-p-phenylene-diamine.
[6]N-t-butyl-2-benzothiazolesulfenamide.
[7]Diphenyl guanidine.

The test rubbers used were CPD copolymers and chlorinated butyl rubbers. The vulcanization conditions for the SBR/PBR blends and the basic blend tread formulation of Table I wherein the test rubber was a CPD copolymer, was 25 minutes at 300°F. Where the test rubber was a chlorinated butyl rubber, the vulcanization condition was 35 minutes at 300°F. In all cases a standard compression molding press, 20×20 inches, operating at approximately 2,000 psi was used for vulcanization of test samples. Various compositions were prepared and tested for evaluation as tire tread compositions. The formulation was compounded using laboratory internal mixers ("midget" Banbury, approximately 300 cc chamber) and mills (6×12 inches, 2 rolls). The mix cycle utilized was as follows: polymers added; at 0.5 min. — stearic acid and antiflex antioxidant; at 1.0 min. — ~90% carbon black; at 3.0 min. — remainder of carbon black and all extender oil; at approximately 6.0 min. — dump (batch temperature ~290°–310° F.). Curative and accelerators incorporated into compound on roll mill. Test samples were then prepared from the formulations and tested in the aforedescribed tests.

Example 1

Various compositions were prepared and tested in accordance with the aforedescribed procedures. Table II shows the results of these tests with various formulations.

It is evident from the results that a composition using CPD copolymer of 20 mole % CPD, thought adequate in all other respects, is inadequate from the standpoint of adhesion tests using the formulation shown in Table I. Where the CPD content of the CPD copolymer is 33%, the tire tread composition meets all test requirements and abrasion resistance is further increased.

Table II

SUMMARY OF CPD COPOLYMER PERFORMANCE IN BLEND TREADS[a]

| | | | | |
| --- | --- | --- | --- | --- |
| SBR 1502 | 70 | 50 | 50 | 50 |
| PBD - Phillips cis-4 | 30 | 20 | 20 | 20 |
| CHLOROBUTYL 10-68 (b) | — | 30 | — | — |
| CPD (~20 mole % CPD) (c) | — | — | 30 | — |
| CPD (~33 mole % CPD) (d) | — | — | — | 30 |
| Adhesion at 250°F. (e) | | | | |
| Lb/In. | 150 | 9 | 8 | 44 |
| Type | T | I | T | T |
| Abrasion Index (f) | 155 | 85–95 | 100–110 | 110–120 |
| Wet Skid Resistance (g) | 17 | 20 | 23 | 21 |
| Heat Build-up, ΔT °F. (h) | 64 | 66 | 76 | 75 |
| Damping, cω/k (i) | .215 | .239 | .283 | .345 |
| | .200 | .253 | .324 | .412 |
| Tensile Strength, psi | 2490 | 2210 | 2260 | 2240 |
| Hardness, Shore A | 61 | 64 | 65 | 68 |

[a] All compounds contain: N-339 Black — 65, Sundex 790 Oil — 30, Thermoflex A — 0.75, Stearic Acid — 1, Zinc Oxide — 3, Sulfur — 1.6, Santocure NS — 1.2, DPG — 0.1.
(b) Mooney Viscosity (ML 1+3 at 260°F.) = 50–60, Chlorine = 1.1–1.3 wt. %.
(c) Mooney Viscosity (ML 1+8 at 260°F.) = 84, Number avg. molecular weight = 200 × 10³.
(d) Mooney Viscosity (ML 1+8 at 260°F.) = 70–105, Number avg. molecular weight = 100–140 × 10³.
(e) To a natural rubber belt ply compound. T = tearing failure, I — interfacial.
(f) Pico test.
(g) British portable skid resistance tester.
(h) Goodrich flex: 118°F., 24.5 lb., 25 min.
(i) Room temperature: 20 mils/15 cps and 2 mils/100 cps respectively.

EXAMPLE 2

The high temperature adhesion of tread formulations was measured using various substrates. The substrates tested were a natural rubber belt ply compound used in the manufacture of radial ply tires and a carcass compound. The compositions of the substrates are shown in Table III. The cyclopentadiene copolymer shown in Table III was incorporated into the blend at 30 weight percent. As is evident from the Table, copolymers containing 33% CPD prove to be more than adequate while the chlorinated butyl rubber compositions and the compositions containing CPD copolymer of about 20% CPD did not meet test requirements based on laboratory tests.

EXAMPLE 3

Various compositions were prepared wherein the test rubber level was varied from 20–40 weight percent. In most cases, an attempt was made to keep the ratio of SBR and PBR constant. The results are shown in Table IV. As is evident from Table IV, the adhesion strength of chlorinated butyl rubber compositions is reduced dramatically as the amount of chlorinated butyl rubber incorporated in the composition exceeds 20 weight percent. Adequate results were achieved with CPD compositions containing as much as 30 weight percent, although at 40 weight percent of the CPD copolymer the adhesion at 250° is 18 and, therefore, does not meet the test specification. It is 80% greater than that for chlorinated butyl rubber at 30%, i.e. 10. The chlorinated butyl rubber compositions proved to be adequate in the field testing of tires. Hence, one would expect to obtain acceptable performance with a composition containing as much as 40 weight % of CPD copolymer.

Table III

SUPPLEMENTAL DATA - HIGH TEMPERATURE
ADHESION OF TREAD FORMULATION

Adhesion of Blend Tread Compound[1]
To Indicated Substrate (lb./in.)[2]

|  | NR Belt Ply Compound[3] | | Carcass Compound[4] | |
| --- | --- | --- | --- | --- |
|  | 250°F. | 150°F. | 250°F. | 150°F. |
| Chlorinated Butyl Rubber | 8-11(I) | 34(T) | 18(I) | 44(T) |
| CPD~20% CPD | 8-10(T) | — | — | — |
| CPD~33% CPD | ~50(T) | 130(T) | 63(T) | 135(T) |
| CPD~33% CPD (lower MW) | 28(T) | 140(T) | 75(T) | 170(T) |

[1]Formulation: SBR — 50, PBR — 20, CHLOROBUTYL or CPD — 30, N—339 Black — 65, Sundex 790 Oil — 30, Thermoflex A — .75 Stearic Acid — 1, Zinc Oxide — 3, Sulfur — 1.6, Santocure NS — 1.2, DPG — 0.1.
[2]T = stock tearing; I = interfacial separation.
[3]Formulation: Natural rubber (No. 1RSS) — 100, GPF Carbon black — 50, Flexon 391 oil — 8, Zinc oxide — 3, Stearic Acid — 1.5, Amberol ST140F — 2, Agerite DPPD — 1, Sulfur — 3, MBT — 0.25, Santocure MOR — 0.75.
[4]Formulation: Natural rubber (No. 1RSS) — 40, SBR 1500 — 60, GPF black — 60, Circosol 4240 — 6, Piccopale Resin 100SF — 10, Stearic acid — 1.5, Wingstay T — 1.0, Zinc oxide — 5, Sulfur — 2.2, Amax — 1.25, MBTS — 0.15.

Table IV

EFFECT OF BLEND COMPOSITION VARIATIONS

| Run | 1 | 2 | 3 | 4 | 5 | 6 | 7 |
| --- | --- | --- | --- | --- | --- | --- | --- |
| Component |  |  |  |  |  |  |  |
| SBR | 70 | 57 | 50 | 43 | 57 | 50 | 43 |
| PBR | 30 | 23 | 20 | 17 | 23 | 20 | 17 |
| CHLOROBUTYL | — | 20 | 30 | 40 | — | — | — |
| CPD~33% CPD | — | — | — | — | 20 | 30 | 40 |
| Adhesion |  |  |  |  |  |  |  |
| At 250°F. Lbs./In. | 115 | 80 | 10 | 4 | 100+ | 70 | 18 |
| Type | T | T | I | I | * | T | I |

*Tore to backing. T = stock tear, I = interfacial, P = plucking failure (incipient tear) Remainder of formulation as shown in Table 1.

EXAMPLE 4

Various compositions were prepared using the basic formulation and tested in adhesion. The variable used was the weight percent cyclopentadiene in the CPD copolymer as measured by nuclear magnetic resonance (NMR). Adhesion was tested at 250°F. Comparison points for chlorinated butyl rubber and the test data are shown in the FIGURE. It will be noted that to achieve the adhesion specification of 25 pounds, the polymer must contain at least 25 mole percent CPD. There appears to be no need to increase CPD concentration much beyond ~33% CPD based solely on adhesion results under the conditions of this evaluation. Of course, other characteristics of the rubber will vary with increasing CPD for example, hardness. Hence, an upper limit for CPD is about 40 mole percent, more preferably about 35 mole percent. The results achieved with chlorinated butyl rubber can be obtained using a copolymer comprising about 23 mole percent CPD. Hence, the preferred range of CPD content of the CPD copolymer is about 23 to about 35 mole percent, most preferably, about 25 to about 33 mole percent.

What is claimed is:

1. A tire tread composition exhibiting improved wet skid resistance which comprises a blend of at least one general purpose rubber selected from the group consisting of natural rubber, synthetic polyisoprene, styrene butadiene rubber, polybutadiene rubber, and mixtures thereof, and at least 20 weight percent of an elastomeric copolymer, based on the copolymer plus general purpose rubber, of isobutylene and cyclopentadiene wherein said copolymer comprises about 20 to about 40 mole percent cyclopentadiene.

2. The composition of claim 1 wherein the general purpose rubber comprises a blend of styrene butadiene rubber (SBR) and polybutadiene rubber.

3. The composition of claim 2 wherein the composition comprises about fifty (50) parts of SBR to about twenty (20) parts of polybutadiene rubber.

4. The composition of claim 1 wherein the copolymer is incorporated into the blend at about 20 to about 40 weight percent.

5. The composition of claim 1 wherein the cyclopentadiene content of the copolymer is about 23 to about 35 mole %.

6. The composition of claim 5 wherein the cyclopentadiene content of the copolymer is about 25 to about 33 mole %.

7. The composition of claim 4 wherein the copolymer comprises about 25 to about 35 weight % of the blend.

* * * * *